United States Patent
Smith

(10) Patent No.: US 6,946,957 B2
(45) Date of Patent: Sep. 20, 2005

(54) REMOTE CONTROL SYSTEM WITH LED INDICATORS

(75) Inventor: Simon Riegels Smith, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 56 days.

(21) Appl. No.: 10/405,448

(22) Filed: Apr. 2, 2003

(65) Prior Publication Data

US 2004/0196151 A1 Oct. 7, 2004

(51) Int. Cl.⁷ .................................................. G08B 1/08
(52) U.S. Cl. ............................. 340/539.17; 340/7.55; 340/7.61
(58) Field of Search ....................... 340/539.17, 825.36, 340/825.37, 7.1, 7.2, 7.21, 7.22, 7.23, 539.11, 539.14, 539.16, 539.22, 539.25, 7.32, 7.33, 7.36, 7.39

(56) References Cited

U.S. PATENT DOCUMENTS

| | | | |
|---|---|---|---|
| H1713 H * | 3/1998 | Pearlman et al. | 340/7.29 |
| 6,144,363 A * | 11/2000 | Alloul et al. | 345/618 |
| 6,696,942 B2 * | 2/2004 | Sweatt | 340/539.1 |
| 2003/0141990 A1 * | 7/2003 | Coon | 340/902 |

OTHER PUBLICATIONS

Ambient News, available at http://www.ambientdevices.com/cat/news.html (last visited Mar. 6, 2003).

Ambient Devices "Questions or Comments", available at http://www.myambient.com/java/my_devices/help.jsp (last visited Mar. 6, 2003).

Ambient Orb Order Form, available at http://www.ambient-devices.com/cat/orb/orborder.html (last visited Mar. 6, 2003).

* cited by examiner

Primary Examiner—Jeffery Hofsass
Assistant Examiner—Jennifer Stone
(74) Attorney, Agent, or Firm—Shook, Hardy & Bacon, L.L.P.

(57) ABSTRACT

A method and system are provided for remotely notifying a user of incoming information. The system comprises detection tools for detecting incoming information on a processing device and a signal generator for generating and sending a signal to a remote control device based on the detected incoming information on the processing device. The system additionally comprises signal reception apparatus on the remote control device for receiving the signal and an indicator on the remote control device for indicating the type of information to a user. The indicator is preferably a visible indicator including at least one LED.

18 Claims, 7 Drawing Sheets

REMOTE CONTROL SYSTEM WITH LED INDICATORS

TECHNICAL FIELD

The invention relates to the field of communications, and in particular to communications within a household environment.

BACKGROUND OF THE INVENTION

With the increased usage of voice mail, email, and intelligent communication devices in the home, there is a greater need to notify persons within a household that information is available. Currently, individual devices perform the notification function when a household user activates the individual devices. For instance, a notification mechanism operating on a computer may notify household members that an email message has arrived. An answering machine connected with a telephone may notify household members that a voice message has arrived.

Currently, no system exists for notifying household members of available information in a unified manner. For instance, while watching television or talking on the telephone, household members will be unaware of email that has been received. Household members using a computer or watching television may be unaware that a voice mail message has been recorded. Accordingly, a solution is needed that can notify a household member of available information regardless of the location and current activity of the household member and the nature or source of the newly received information.

BRIEF SUMMARY OF THE INVENTION

The present invention is directed to a method and computer application for remotely notifying a user of incoming information. The system includes detection tools for detecting incoming information on a processing device. The system additionally includes a signal generator for generating and sending a signal to a remote control device based on the detected incoming information on the processing device. The system further includes signal reception apparatus on the remote control device for receiving the signal and an indicator on the remote control device for providing the notification to a user.

In yet another aspect of the invention, a remote control device includes control tools for controlling an audio or video apparatus and communication tools for communicating with at least one remote processing device that provides information to the remote control device. The remote control device additionally includes an indicator for alerting a user that information has been received from the remote processing device.

In still a further aspect of the invention, a method is provided for remote notification using a remote control device. The method includes processing incoming information on a processing device to determine a type of information. The method additionally includes generating a signal based on the information received by the processing device and sending the signal to a remote control device. The method also includes notifying a user of the information transmitted using an indicator on the remote control device.

Additional advantages and novel features of the invention will be set forth in the description which follows, and in part will become apparent to those skilled in the art upon examination of the following, or may be learned from practice of the invention.

BRIEF DESCRIPTION OF THE DRAWINGS

The present invention is described in detail below with reference to the attached drawing figures, wherein.

DETAILED DESCRIPTION OF THE INVENTION

Figure 1:
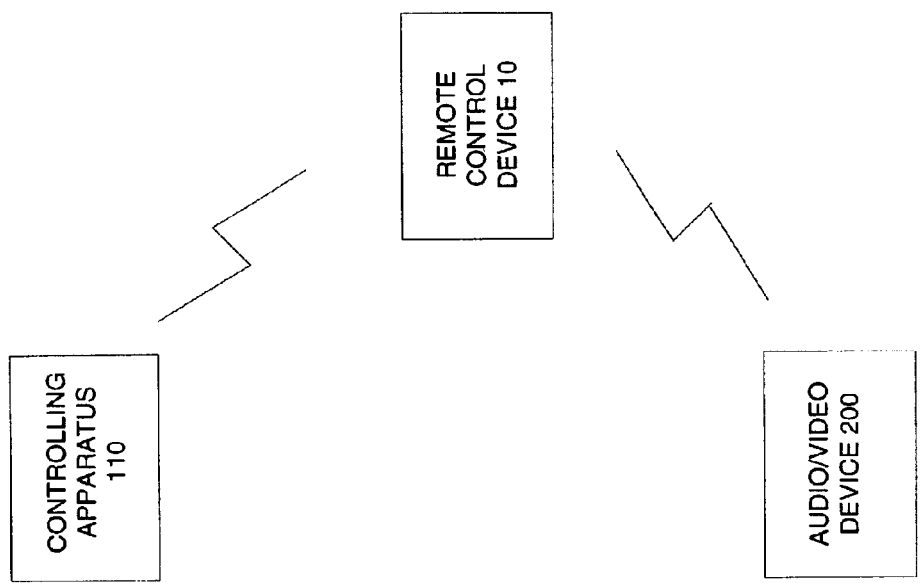
FIG. 1 is a block diagram illustrating components of a system for remote notification in accordance with an embodiment of the invention.

FIG. 1 is a block diagram illustrating components of a system for remote notification in accordance with an embodiment of the invention. A remote control device 10 communicates with a controlling apparatus 110. The remote control device 10 may be used to control an audio/video device 200.

Figure 2:
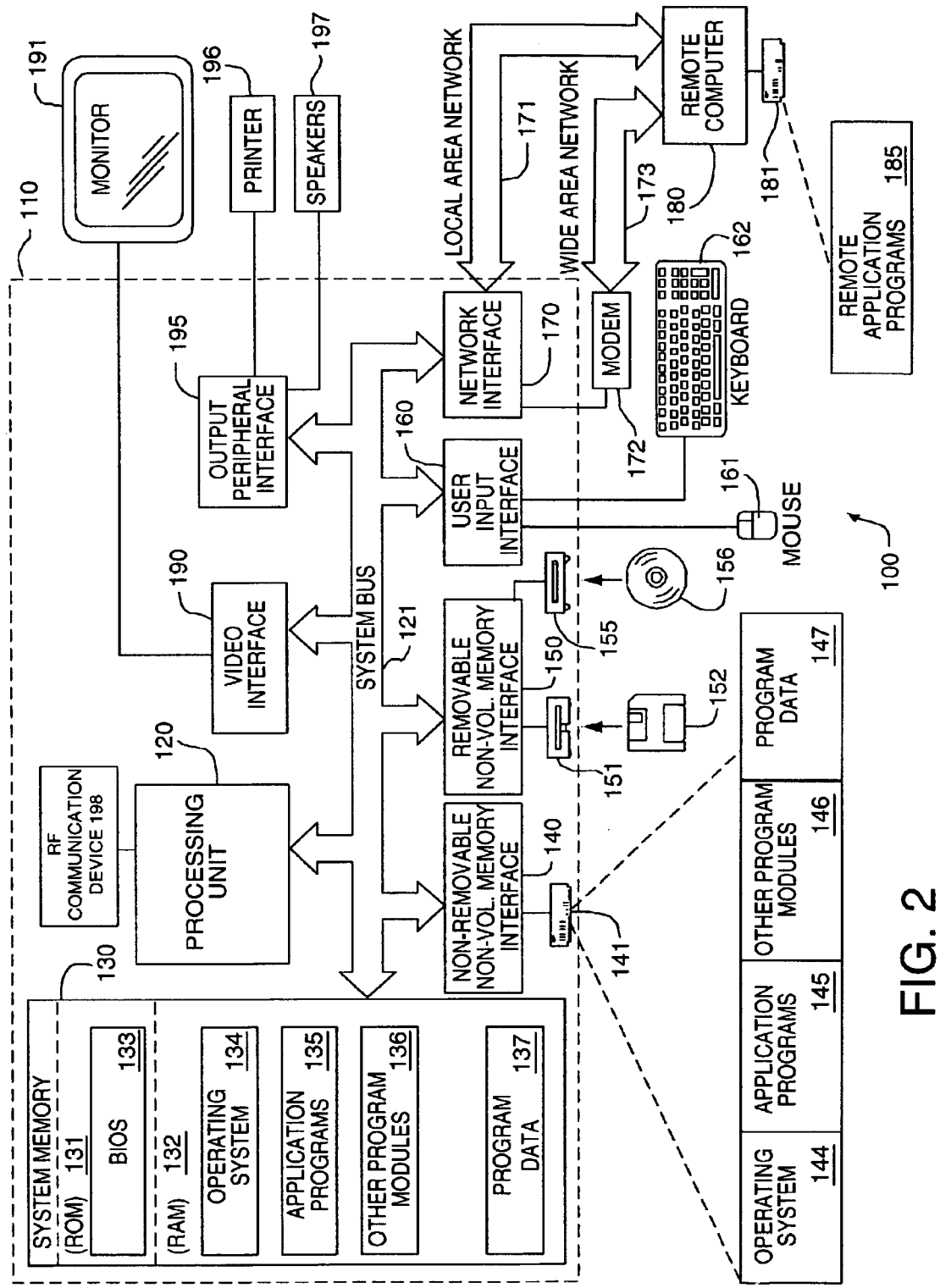
FIG. 2 is a block diagram of a controlling system environment suitable for use in implementing the present invention.

FIG. 2 illustrates an example of a suitable controlling apparatus environment 100 in which the invention may be implemented. In one embodiment of the invention, the controlling apparatus environment 100 includes a personal computer. However, the controlling apparatus environment 100 may also include an answering machine, a security system, or any other apparatus that receives information valuable to a system user. Whereas a personal computer could inform a user that email information has been received, an answering machine could provide remote voicemail information and a security system could provide remote status information. Additionally, multiple controlling devices such as a PC, an answering machine, and a security system may form the controlling apparatus 110.

In order to communicate with the remote control device 10, the controlling apparatus 110 preferably includes an RF communication device 198. The communication device 198 may include a transmitter for one-way communication or a transceiver for two-way communication. Alternatively, the controlling apparatus 110 may include infrared communication tools if the controlling apparatus 110 is located in the same area as the remote control device 10 such that a line of sight exists between the controlling apparatus 110 and the remote control apparatus 10.

The controlling apparatus environment 100 is only one example of a suitable environment and is not intended to suggest any limitation as to the scope of use or functionality of the invention. Neither should the controlling apparatus environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system environment 100 for implementing the invention includes a general purpose computing device in the form of a computer or controlling apparatus 110 including a processing unit 120, a system memory 130, and a system bus 121 that couples various system components including the system memory 130 to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/nonremovable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 10 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 3:
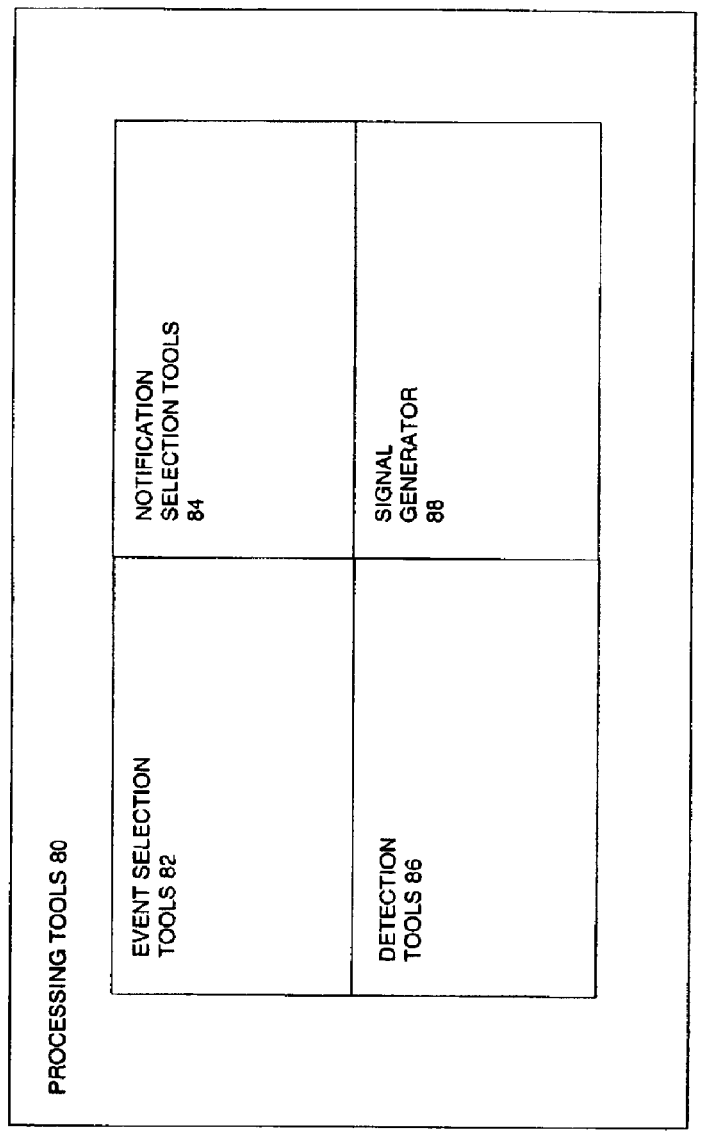
FIG. 3 is a detailed block diagram illustrating processing tools for the controlling system used in accordance with an embodiment of the invention.

FIG. 3 is a block diagram illustrating processing tools that may be used for facilitating communication between the controlling apparatus 110 and the remote control device 10. The applications programs 135 and/or 145 may include a program module 80 that enables a user to determine the manner in which the controlling apparatus 110 will communicate with the remote control device 10.

The program module 80 preferably includes event selection tools 82, notification selection tools 84, detection tools 86, and a signal generator 88. The aforementioned components operate at the request of the user to activate indicators on the remote control device 10.

Event selection tools 82 allow the user to direct the controlling apparatus 110 to provide notification upon occurrence of a specific event. In the controlling apparatus 110 shown in the embodiment of FIG. 2, a list of events may include such options as: (1) receipt of regular email on a first account; (2) receipt of a high priority email on the first account; (3) receipt of a regular email on a second account; (4) receipt of a high priority email on the second account; and (5) the occurrence of an event listed on a calendar. If additional controlling devices are included in the controlling apparatus 110, or if peripheral devices communicate additional types of information to the controlling apparatus 110, events may further include receipt of a voice mail message, receipt of a security alert, or receipt of an alarm sounding. Other events may also be included.

After selecting an event using the event selection tools 82, the user may select a notification method using notification selection tools 84. The notification selection tools may allow a user to select a color such as red, green, blue, or purple. The LED colors available may be combined to create an expansive spectrum of colors for notifying a user of a vast quantity of different types of events. The user may also select a flash rate from a plurality of available flash rates. Typical flash rates may range from five flashes per second to one flash per every two seconds. Other flash rates may also be available. Alternatively, the LEDs, once activated, may remain on, without any flashing. Different flash rates and different colors can be used to indicate different types of events as described above, such as different forms of information and/or different target recipients of the information.

After the event selection tools 82 and notification selection tools 84 have been activated, detection tools 86 operate to detect the occurrence of the selected events and a signal generator 88 operates to generate a signal for providing notification in accordance with the settings provided by the notification selection tools 84. After being prompted by the detection tools 86, the signal generator 88 may send the remote control device 10 a message every time an LED is to be turned on or off For example, the signal generator 88 would send a message twice every second, once to turn the LED on and once to turn the LED off, if the LED were to flash once every second. The signal generator 88 may repeat the message until the notification is turned off. In this instance, the remote is "dumb". It may be preferable to have a more "intelligent" remote. In such an embodiment, the signal generator 88 only needs to send one message to the remote control device 10. Both the "intelligent" and "dumb" embodiments of the remote control device are further described below.

Figure 4:
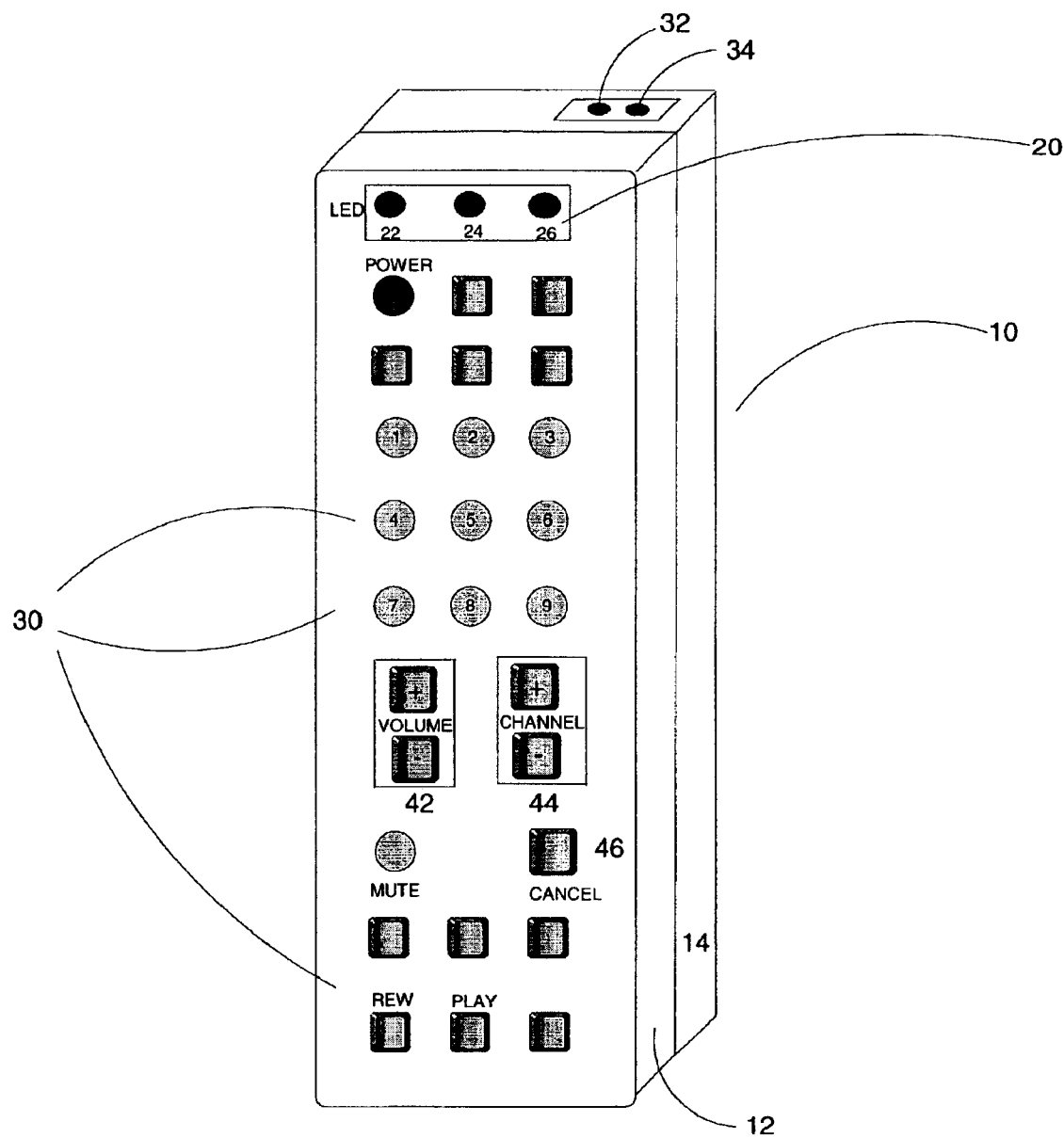
FIG. 4 is a perspective view of a remote control device in accordance with an embodiment of the invention.

An embodiment of the remote control device 10 is shown in FIG. 4. The remote control device 10 preferably can communicate through infrared signals with a remote control receiver built into the audio/video device 200. Alternatively, the remote control device 10 may communicate with the audio/video device 200 using RF technology such that no line of sight is required. In this instance, the remote control device 10 would be able to control the audio/video device 200 from any room in the house. The audio/video device 200 may be a television, VCR, stereo, CD, DVD, or any other electronic apparatus. The remote control device 10 preferably has the capability to turn on the audio/video device 200, raise or lower the volume, change the channels, adjust brightness or tone, and to turn off the device 200.

In the displayed embodiment, the remote control device 10 preferably includes a front housing 12 and a rear housing 14 as shown in FIG. 4. The front housing 12 may include a plurality of panels (not shown). The panels may include a first panel with openings and a second panel having protruding push buttons 30 for extending through the openings. The buttons 30 include controls 42 for adjusting volume, controls 44 for changing channels, and a cancel control 46 for canceling notifications sent from the control apparatus 110. Other pushbuttons 30 may be provided in order to offer the functionality generally provided by remote control devices.

In the illustrated embodiment, a translucent portion 20 in the front housing 12 preferably accommodates light emitting diodes 22, 24, and 26. The light emitting diodes 22, 24, and 26 are preferably varied in color, such that one of the three diodes is a red diode, another of the three diodes is a green diode, and a last of the three diodes is a blue diode. Alternatively, each of the diodes 22, 24, 26 may be individually capable of projecting multiple colors. The embodiment using three diodes is merely exemplary. One or two multi-colored diodes may be used or more than three diodes may be used as deemed preferable. The location and configuration of the light emitting diodes 22, 24, and 26 may be varied in any manner as long as the light emitted by the diodes 22, 24, and 26 is visible to a user of the remote control device 10.

In other embodiment of the invention, the provided diodes 22, 24, 26 may combine into a single light channel, by using a piece of translucent plastic or similar device, to form one spot of light coming from the remote control device 10. The colors from each LED combine to form any other color. By using the three colors red, green and blue, any color from the visible spectrum may be created.

In another embodiment of the invention, the entirety of the front housing 12 and the rear housing 14 may be made from a translucent material such that the entirety of the remote control device 10 changes colors and/or flashes at different rates. The same concept can be supplied to a specific portion of the remote control device. For example, using either of the aforementioned configurations could illuminate the buttons. Such an embodiment is typically called backlighting.

In order to communicate with the audio/video device 200, additional LEDs 32 and 34 may be provided at another location on the housing for facilitating infrared communication. In order to communicate with the controlling apparatus 110, an RF transceiver 40, shown in FIG. 5, may be provided within the remote control device 10. Any known RF technology such as Bluetooth or 802.11b could be used.

As an alternative to an RF transceiver 40, additional LEDs could be provided for allowing infrared communication between the controlling apparatus 110 and the remote control device 10. If infrared communication is used, a line of sight would be provided between the controlling apparatus 110 and the remote control device 10.

Figure 5:
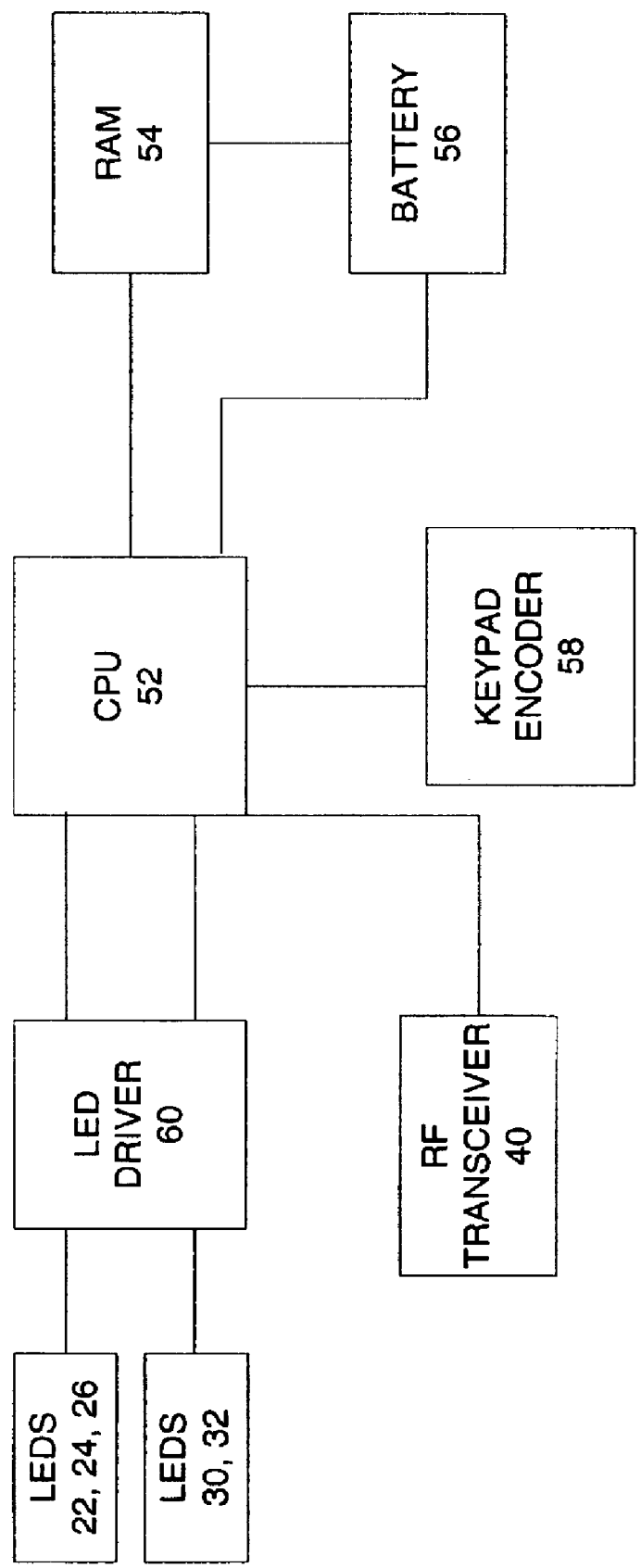
FIG. 5 is a block diagram of circuitry provided within the remote control device in accordance with an embodiment of the invention.

FIG. 5 illustrates circuitry 50 contained within an embodiment of the remote control device 10. The notification LEDs 22, 24, and 26 as well as the IR communication LEDs 30 and 32 may be coupled to a central processing unit (CPU) or microcontroller 52. Alternatively, a dedicated integrated circuit (IC) or any other suitable device could be used. As set forth above, the CPU or microcontroller 52 may have "intelligent" components such that it is able to receive multiple instructions for the LEDs and activate the LEDs accordingly.

An LED driver 60 may be included between the LEDs 22, 24, 26 and the LEDs 30 and 32 in order to provide sufficient current for the LEDs without overloading the CPU or microcontroller 52. Optionally, A RAM 54 or other storage device may also be coupled to the CPU 52 and may be backed up by a battery 56. Although this memory device may be included, it is not required to implement the disclosed invention. The battery 56 may be a lithium battery or other suitable battery. A keypad encoder 58 may also coupled to or incorporated in the CPU or microcontroller 52. The keypad encoder encodes the button presses into key codes that the microcontroller or CPU 52 can interpret. An RF communication device 40 may include a transceiver for two-way communication with the controlling device 110 or a receiver for one-way communications with the controlling device 110.

The battery 56 may be a typical removable battery or a rechargeable battery. In order to conserve battery life, the remote control device 10 could periodically poll the controlling device 110 looking for new instructions or notifications rather than maintaining continuous communication with the controlling device 110.

As described above, the controlling device 110 and the remote control device 10 may be constructed for either a one-way or a two-way communication mode. The one-way mode is typically less expensive to implement than the two-way mode. The one-way mode requires the controlling device 110 to include a transmitter as its RF communication device and the remote control device 10 to include a receiver as its RF communication device. In the one-way mode, after the user receives notification on the remote control device 10, the user may return directly to the controlling device 110 in order to turn off the notification. Alternatively, the user may use the cancel notification button 46 on the remote control device 10 to terminate the flashing on the remote control device 10 without notifying the controlling device 110.

In the two-way scenario, both the controlling device 110 and the remote control device 10 include transceivers as RF communication devices. When the user views a notification on the remote control device 10, the user can activate the cancel button 46. The remote control device 10 uses its transceiver to send a message back to the controlling device 110 indicating that the user has viewed the notification. The controlling device 110 can then cancel the notification.

Figure 6:
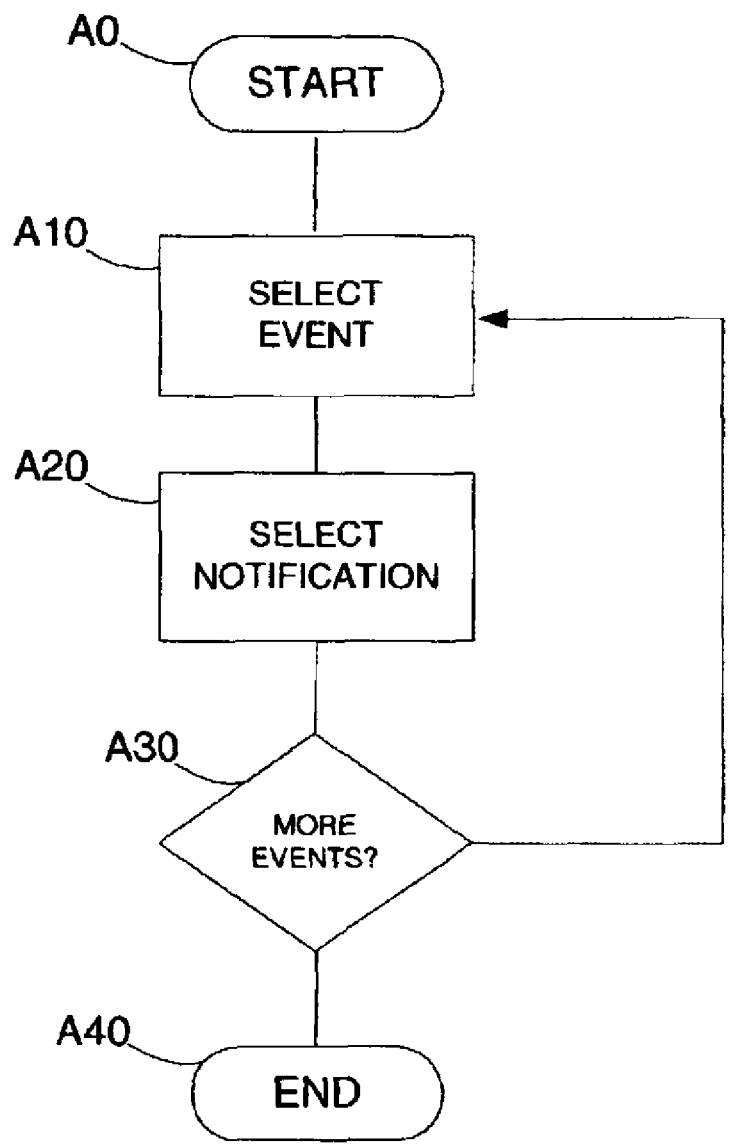
FIG. 6 is a flow chart illustrating a method for programming remote notification in accordance with an embodiment of the invention.

FIG. 6 is a flow chart illustrating a method for setting the notifications of the remote control device 10. This method may be performed using the controlling apparatus 110. The user may start in step A0 by gaining access to the controlling apparatus 110. In step A10, the user implements the event selection tools 82 to select an event, such as the reception of an email to a first email account. In step A20, the user may use the notification selection tools 84 to select a type of notification. The user may select for example "activate red", "activate blue" or "activate purple", in step A20. The event setting and the notification setting will cause the remote control LED to have a an illuminated portion having the requested color whenever an email is received in the selected account. The CPU 52 or the processing tools 80 determine the appropriate LEDs for creating the requested color and the optimal intensity for each selected LED. If in step A30, the user desires additional notifications, the user may return to the steps A10 and A20. The user may select "high priority" emails in step A10 using the event selection tools 82. In step A20, the user may implement notification selection tools 84 to select, for example, "flash blue LED". These selections will cause a blue LED to flash whenever a high priority email is received. When the user finishes selecting events and notifications, the process ends in step A40.

Figure 7:
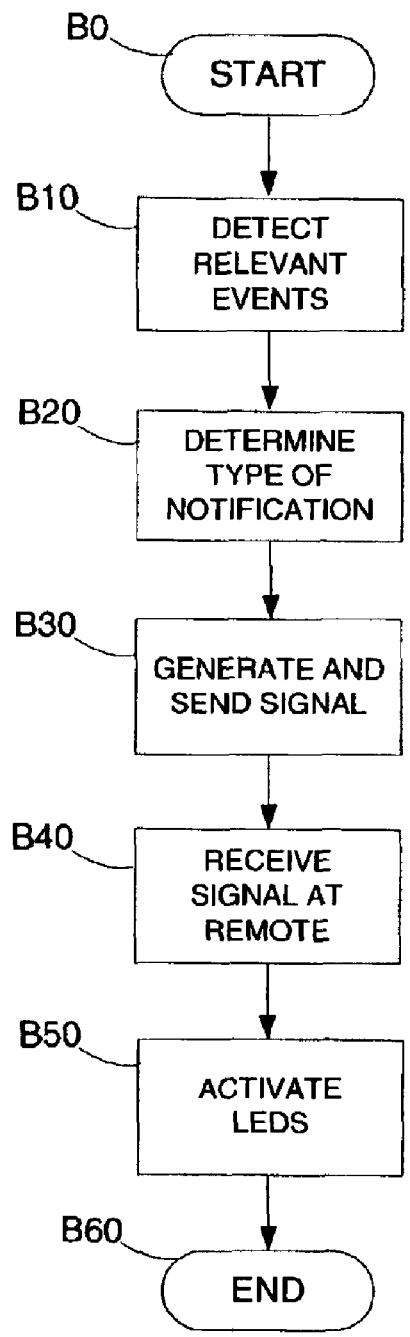
FIG. 7 is a flow chart illustrating a method for remote notification in accordance with an embodiment of the invention.

FIG. 7 is a flow chart showing the notification procedure after the selection process of FIG. 6 has been performed. Upon activation in step B0, the controlling apparatus 110 uses detection tools 86 to detect relevant events as provided by the event selection tools 82. In step B20, the controlling apparatus 110 determines the type of notification that is required for the detected event. In step B30, the signal generator 88 sends a signal corresponding to the detected event. In step B40, the remote control device 10 receives the signal and in step B50, the remote control device 10 activates the appropriate LEDs and the process is complete in step B60. Upon viewing the LED notification, a user may cancel the notification and deactivate the LEDs by pressing the cancel button 46 on the remote control device.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and with the scope of the claims.

What is claimed is:

1. A system for remotely notifying a user of incoming information, the system implemented through a controlling device, the system comprising:

event selection tools on the controlling device, the event selection tools allowing a user to select at least one type of information;

notification selection tools for allowing a user to select a type of notification to be sent by the controlling device in connection with each selected type of information;

detection tools for detecting each selected type of incoming information on the controlling device;

a signal generator within the controlling device for generating and sending a signal to a remote control device based on the detected incoming information and selected notification type on the controlling device, the remote control device comprising components for controlling a remotely located audio or video apparatus using one of RF and IR signals;

signal reception apparatus on the remote control device for receiving the signal from the controlling device; and an indicator on the remote control device for indicating the incoming information to a user.

2. The system of claim 1, wherein the indicator is a visible indicator.

3. The system of claim 2, wherein the visible indicator comprises at least one LED.

4. The system of claim 2, wherein the visible indicator comprises an LED having a first color and an LED having a second color.

5. The system of claim 2, wherein the visible indicator comprises a red LED, a green LED, and a blue LED.

6. The system of claim 4, wherein the first color indicates a first type of information and the second color indicates a second type of information.

7. The system of claim 4, wherein the first color indicates a message for a first user and the second color indicates a message for a second user.

8. The system of claim 3, wherein the LED has at least two flash rates, wherein a first flash rate indicates a first type of message and a second flash rate indicates a second type of message.

9. The system of claim 8, wherein the first type of message has a high priority and the second type of message has a lower priority.

10. The system of claim 1, wherein the controlling device comprises a personal computer.

11. The system of claim 1, wherein the information is an electronic mail message.

12. A method for remote notification using a remote control device, the method comprising:

storing a user selection of an information type for remote notification on a controlling device processing incoming information on the controlling device;

determining a type of incoming information using the controlling device;

generating a signal based on the information type received by the controlling device if the information type corresponds to the user selection;

sending the signal to a remote control device including components for controlling a remote video or remote audio system;

notifying the user of the information transmitted using at least one visible LED indicator on the remote control device, the indicator pre-selected by the user to correspond to the information type.

13. The method of claim 12, wherein the visible indicator comprises an LED having a first color and an LED having a second color.

14. The method of claim 12, wherein the visible indicator comprises a red LED, a green LED, and a blue LED.

15. The method of claim 30, further comprising using the first color LED to indicate a first type of information and using the second color LED to indicate a second type of information.

16. The method of claim 13, further comprising using the first color to indicate a message for a first user and a second color to indicate a message for a second user.

17. The method of claim 12, further comprising flashing the LED at a first flash rate to indicate a first type of message and flashing the LED at a second flash rate to indicate a second type of message.

18. The method of claim 17, wherein the first type of message has a high priority and the second type of message has a lower priority.

* * * * *

UNITED STATES PATENT AND TRADEMARK OFFICE
CERTIFICATE OF CORRECTION

PATENT NO. : 6,946,957 B2 Page 1 of 1
APPLICATION NO. : 10/405448
DATED : September 20, 2005
INVENTOR(S) : Simon Riegels Smith It is certified that error appears in the above-identified patent and that said Letters Patent is hereby corrected as shown below:

In column 4, line 35, delete "10" and insert -- 110 --, therefor.

In column 9, line 15, in Claim 12, after "device" insert -- ; --.

In column 9, line 20, in Claim 12, after "device" delete ";" and insert -- : --, therefor.

In column 10, line 10, in Claim 15, delete "claim 30" and insert -- claim 13 --, therefor.

Signed and Sealed this

Twenty-eighth Day of July, 2009

JOHN DOLL
*Acting Director of the United States Patent and Trademark Office*